United States Patent
Thomas et al.

(10) Patent No.: US 8,321,101 B2
(45) Date of Patent: Nov. 27, 2012

(54) TEMPERATURE DEPENDENT MINIMUM TRANSMISSION INPUT SPEED

(75) Inventors: Steven Gerald Thomas, Bloomfield Hills, MI (US); Peter John Grutter, Plymouth, MI (US); Felix Nedorezov, Rochester Hills, MI (US); Bal G. Sankpal, Canton, MI (US); John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 628 days.

(21) Appl. No.: 12/435,715

(22) Filed: May 5, 2009

(65) Prior Publication Data
US 2010/0286877 A1    Nov. 11, 2010

(51) Int. Cl.
G06F 17/00 (2006.01)
(52) U.S. Cl. ........ 701/54; 137/565.01; 137/565.11; 73/114.52; 73/114.55; 477/98
(58) Field of Classification Search ........... 701/54, 701/48; 137/14, 565.01, 565.11; 73/114.52, 73/114.55; 477/98
See application file for complete search history.

(56) References Cited

U.S. PATENT DOCUMENTS

| | | | |
|---|---|---|---|
| 5,166,879 A | 11/1992 | Greene et al. | |
| 5,556,349 A | 9/1996 | Ishii et al. | |
| 5,612,874 A | 3/1997 | Schulz et al. | |
| 5,642,283 A | 6/1997 | Schulz et al. | |
| 5,665,028 A * | 9/1997 | Hayasaki | 477/143 |
| 6,262,556 B1 * | 7/2001 | Hubbard et al. | 318/798 |
| 6,299,565 B1 | 10/2001 | Jain et al. | |
| 6,434,466 B1 | 8/2002 | Robichaux et al. | |
| 6,466,854 B1 | 10/2002 | Henneken et al. | |
| 6,577,939 B1 | 6/2003 | Keyse et al. | |
| 6,634,984 B1 | 10/2003 | Doering et al. | |
| 6,675,079 B2 | 1/2004 | Kwon | |
| 6,863,640 B2 * | 3/2005 | Kobayashi et al. | 477/156 |
| 6,994,647 B2 | 2/2006 | Cicala et al. | |
| 2003/0109970 A1 * | 6/2003 | Nakamori et al. | 701/22 |
| 2004/0211470 A1 * | 10/2004 | Apostolides | 137/565.11 |
| 2005/0028759 A1 * | 2/2005 | Epshteyn | 123/46 R |
| 2005/0188953 A1 * | 9/2005 | Ishikawa et al. | 123/339.11 |
| 2005/0193734 A1 * | 9/2005 | Iwanami et al. | 60/657 |

(Continued)

FOREIGN PATENT DOCUMENTS
JP    4066337    3/1992

(Continued)

*Primary Examiner* — Tuan C. To
(74) *Attorney, Agent, or Firm* — Diederiks & Whitelaw, PLC

(57) ABSTRACT

A system and method is employed to regulate a minimum transmission input speed based on automatic fluid temperature. The system includes a temperature sensor for sensing a temperature of the automatic transmission fluid and a controller for setting a minimum engine speed of the engine based on the temperature of the automatic transmission fluid. The size of a transmission pump may be reduced while the pump is still able to supply enough automatic transmission fluid to friction elements and gear ratios to provide lubrication and enable friction element actuators to engage and disengage the friction elements in a timely and effective manner. In a preferred form of the invention, when the temperature of the automatic transmission fluid is below 210° F., the minimum engine speed is set to no greater than 900 rpm; and when the temperature of the automatic transmission fluid is above 210° F., the minimum engine speed is set to no less than 1000 rpm.

14 Claims, 5 Drawing Sheets

U.S. PATENT DOCUMENTS

| | | | |
|---|---|---|---|
| 2006/0185626 A1* | 8/2006 | Allen et al. | 123/41.12 |
| 2007/0082785 A1* | 4/2007 | Fukushiro et al. | 477/115 |
| 2008/0077297 A1* | 3/2008 | Ito et al. | 701/48 |
| 2008/0286123 A1* | 11/2008 | Yoshinami | 417/118 |
| 2009/0069151 A1* | 3/2009 | Koski et al. | 477/98 |
| 2009/0101001 A1* | 4/2009 | Lloyd | 91/532 |
| 2009/0194176 A1* | 8/2009 | Muller et al. | 137/565.11 |
| 2009/0241535 A1* | 10/2009 | Schultz et al. | 60/486 |
| 2010/0211276 A1* | 8/2010 | Tokura et al. | 701/58 |
| 2010/0222974 A1* | 9/2010 | Nakamura et al. | 701/62 |

FOREIGN PATENT DOCUMENTS

| | | | |
|---|---|---|---|
| JP | 2005042808 A | * | 2/2005 |
| JP | 2006105179 A | * | 4/2006 |
| JP | 2008116004 A | * | 5/2008 |
| JP | 2009092213 A | * | 4/2009 |

* cited by examiner

UPSHIFT CURVES

DOWNSHIFT CURVES

TEMPERATURE DEPENDENT MINIMUM TRANSMISSION INPUT SPEED

FIELD OF THE INVENTION

The present invention pertains to the art of control systems and, more particularly, a system and method for controlling an automotive vehicle transmission in response to temperature changes in automatic transmission fluid passing through the transmission.

BACKGROUND OF THE INVENTION

Automotive vehicles often have an automatic transmission located in a powertrain that delivers power from an engine to traction wheels of the vehicle. When the vehicle accelerates from a standing start, the transmission automatically changes the relative ratio of a transmission input shaft that receives power from the engine and a transmission output shaft that delivers power from the transmission to downstream elements of the powertrain and eventually to the wheels. The ratio changes are generally performed by selectively braking components of interlinked planetary gear sets or selectively engaging components of the gear sets to other components of the gear sets by the use of friction elements. The gear sets are mounted in a housing that also contains actuators for the friction elements. A pump is used to supply automatic transmission fluid to the friction element actuators to enable them to perform the gear changing function and also provides fluid to the gear sets so that they are properly lubricated.

It is considered desirable in the art to ensure that automobile transmissions allow the complete powertrain to be as efficient as possible. However, because of adjustments required to properly manage transmission operation when the temperature of the automatic transmission fluid is elevated, efficiency can be compromised. The elevated temperature leads to lower viscosity in the automatic transmission fluid which, in turn, leads to reduced pump efficiency and to more fluid leakage as the fluid progresses around the transmission. In order to maintain a required lubrication flow and fluid pressure to supply the friction element actuators so that they may control the friction elements in a timely and effective manner, a minimum allowable pump speed must be increased. Since the pump usually obtains power from the engine, a minimum allowable engine speed must also be increased. Increasing the minimum allowable pump and engine speeds increases fuel consumption and worsens fuel economy.

Generally, prior art solutions to the problem of supplying sufficient automatic transmission fluid that has an elevated temperature were directed to requiring a minimum engine speed that would provide an adequate supply of fluid under worst-case temperature conditions. These solutions had the advantage of simplicity in that once the minimum allowable engine speed was set no further control was necessary. Also, the minimum engine speed required by other factors, such as drivability, vehicle noise and harshness, was frequently higher than the minimum required due to increased automotive fluid temperature so the increased temperature was not a major factor when trying to reduce engine speed. However, in order to reduce parasitic loss of power caused by the transmission fluid pump, transmission designers are reducing transmission pump displacements which, in turn, is requiring higher pump speeds. Thus, the need to provide an adequate supply of transmission fluid can become a controlling factor on minimum engine speed.

Other prior art solutions have been directed to increasing fuel efficiency by addressing different problems. For example, Japanese Patent Document JP 4066337 discloses an oil pump that is directly connected to an engine. The idle speed of the engine is increased when the oil temperature reaches a certain level. Basically, this arrangement is not concerned with setting a minimum engine speed during transmission gear ratio shifts, but rather focuses on adjusting engine idle speed.

Another prior art solution is set forth in U.S. Pat. No. 5,556,349 which discusses a known automatic transmission having a normal temperature shift pattern and a high temperature shift pattern. The goal is to have the automatic controller constantly monitor the transmission fluid temperature and prevent it from overheating by switching to the high temperature shift pattern. The high temperature shift pattern avoids heating the transmission fluid as much as the normal temperature shift pattern in that the high temperature pattern shifts to a higher gear at a higher speed than the normal temperature pattern. This increases torque converter average speed and reduces torque converter average torque, both of which changes reduce the amount of heat generated, particularly by an open torque converter.

As can be seen by the above discussion, there is a need in the art for a system that will effectively reduce the minimum allowable engine speed requirement during gear shifts, while still providing adequate amounts of automatic transmission fluid needed for lubrication and for friction element actuators.

SUMMARY OF THE INVENTION

The present invention is directed to a transmission fluid supply system method employed in a vehicle having an engine for providing power, a transmission including multiple gear ratios and friction elements with associated actuators for engaging and disengaging the friction elements to shift the transmission between gear ratios, and a pump driven by the engine. The system improves vehicle efficiency by regulating a minimum transmission input speed based on automatic transmission fluid temperature. The system includes a temperature sensor for sensing a temperature of the automatic transmission fluid and a controller for setting a minimum engine speed of the engine based on the temperature of the automatic transmission fluid. With this arrangement, the size of the pump may be reduced while the pump is still able to supply enough automatic transmission fluid to the friction elements and gear ratios to provide lubrication and to the actuators to enable the actuators to engage and disengage the friction elements in a timely and effective manner.

In accordance with a preferred embodiment of the invention, when the temperature of the automatic transmission fluid is below 210° F., the minimum engine speed is set to no greater than 900 revolutions per minute (rpm). When the temperature of the automatic transmission fluid is above 210° F., the minimum engine speed is set to no less than 1000 rpm. Therefore, the system operates by sensing a temperature of the automatic transmission fluid and setting a minimum engine speed of the engine based on the temperature of the automatic transmission fluid, whereby a size of the pump may be reduced as compared to known pump arrangements while still being able to supply the automatic transmission fluid to the friction elements and gear ratios to provide lubrication and to the actuators to enable the actuators to engage and disengage the friction elements in a timely and effective manner.

Additional objects, features and advantages of the present invention will become more readily apparent from the fol-

DESCRIPTION OF PREFERRED EMBODIMENTS

Figure 1:
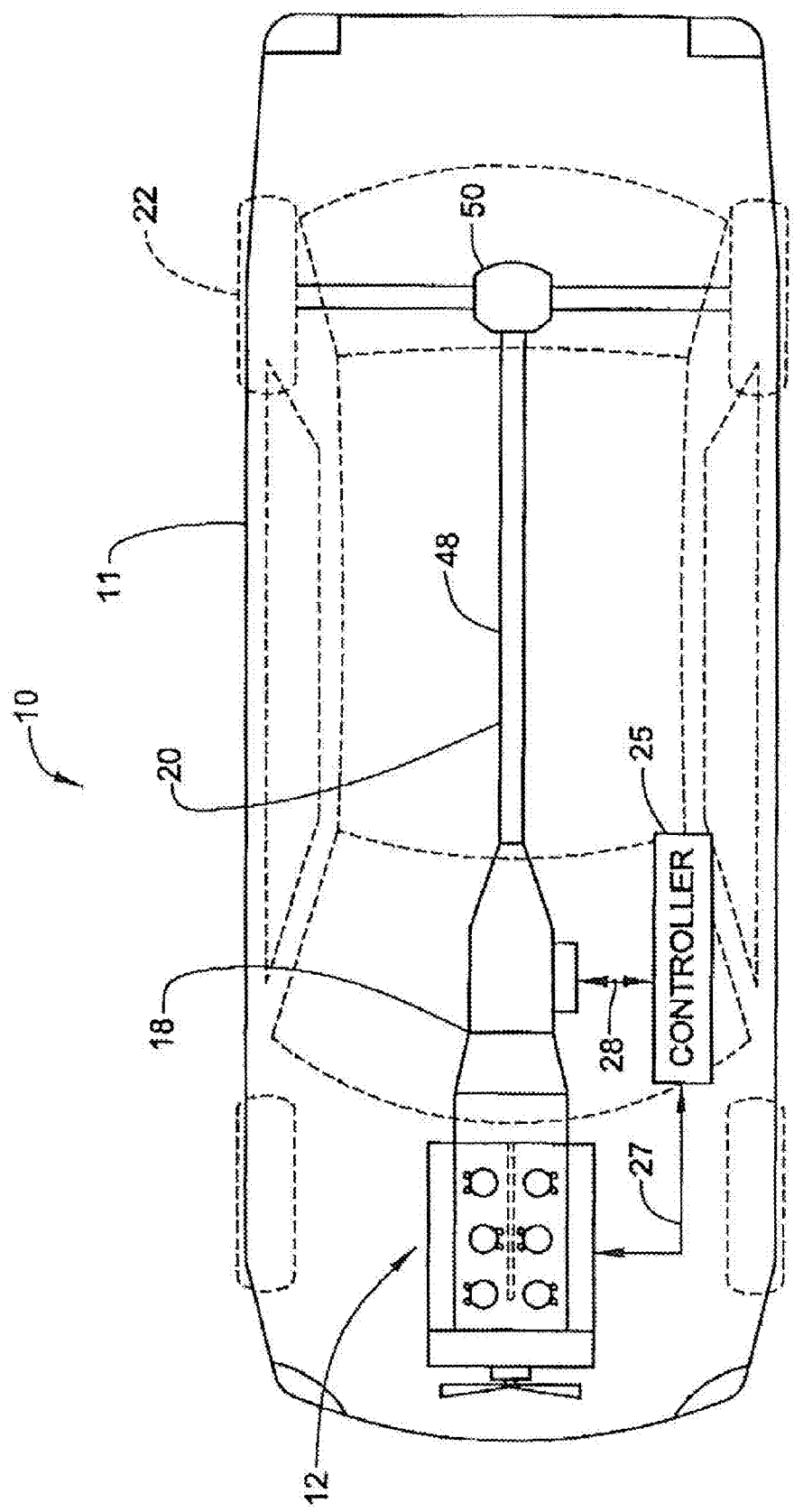
FIG. 1 is a diagram showing a vehicle incorporating a system for improving vehicle performance in accordance with the invention.

With initial reference to FIG. 1, there is shown an automotive vehicle 10 having a body 11 and an engine 12. Power from engine 12 is transmitted to a transmission 18, then to the other portions of a powertrain 20 and eventually to drive wheels 22. Vehicle 10 is shown as a rear wheel drive vehicle but any type of powertrain arrangement, including front wheel or all wheel drive systems, could be employed. In addition, although engine 12 is shown as an internal combustion engine, but other types of drive arrangements, including hybrid drive systems, could be utilized. A controller 25 is connected to engine 12 and transmission 18 by communication lines 27 and 28 respectively. In accordance with the invention, controller 25 functions to set a minimum engine speed based on automatic fluid temperature as more fully discussed below.

Figure 2:
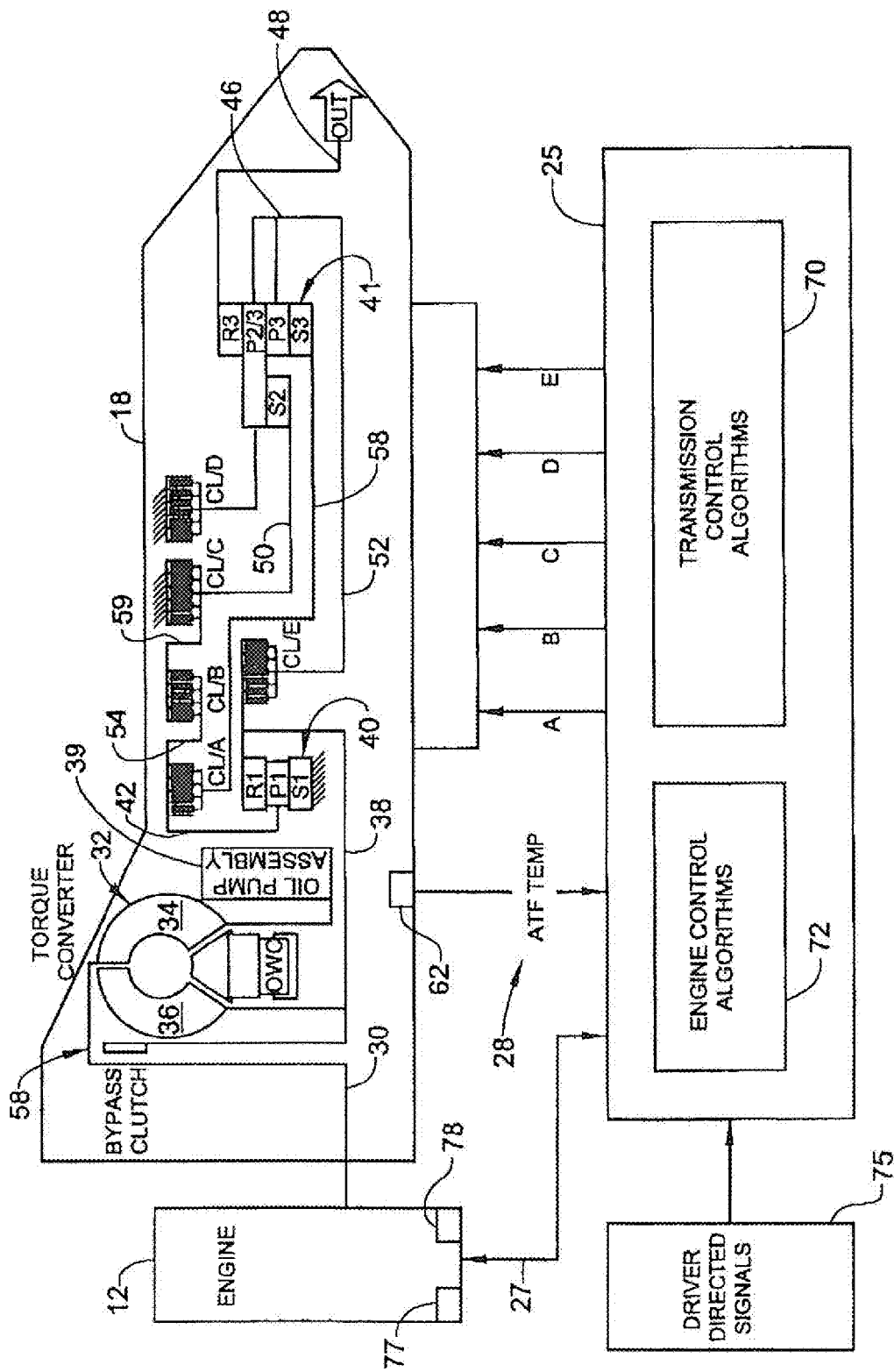
FIG. 2 is a schematic diagram of the system in FIG. 1.

Transmission 18 is schematically illustrated in FIG. 2 with controller 25, wherein ratio changes are controlled by friction elements CL/A-CL/E acting on individual gear elements. Torque from engine 12 is distributed to torque input element 30 of hydrokinetic torque converter 32. An impeller 34 of torque converter 32 develops turbine torque on a turbine 36 in a known fashion. Turbine torque is distributed to a turbine shaft, which is also transmission input shaft 38. Impeller 34 is connected to a relatively small oil pump assembly 39.

Transmission 18 of FIG. 2 includes a simple planetary gearset 40 and a compound planetary gearset 41. Gearset 40 has a permanently fixed sun gear S1, a ring gear R1 and planetary pinions P1 rotatably supported on a carrier 42. Transmission input shaft 38 is drivably connected to ring gear R1. Compound planetary gearset 41, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3, while short planetary pinions P3 further engage sun gear S3. Planetary pinions P2/3 and P3 of gearset 41 are rotatably supported on compound carrier 46. Ring gear R3 is drivably connected to a torque output shaft 48, which is drivably connected to vehicle traction wheels 22 through a differential and axle assembly 50 shown in FIG. 1. Gearset 40 is an underdrive ratio gearset arranged in series with respect to compound gearset 41. Typically, transmission 18 preferably includes a lockup or torque converter bypass clutch, as shown at 58, to directly connect transmission input shaft 30 to engine 12 after a torque converter torque multiplication mode is completed and a hydrokinetic coupling mode begins.

During operation in the first four forward driving ratios, carrier P1 is drivably connected to sun gear S3 through shaft 58 and forward friction element CL/A. During operation in the third ratio, fifth ratio and reverse, direct friction element CL/B drivably connects carrier 42 to shaft 59, which is connected to large pitch diameter sun gear S2 through shaft 60. During operation in the fourth, fifth and sixth forward driving ratios, overdrive friction element CL/E connects turbine shaft 38 to compound carrier 46 through shaft 28. Friction element CL/C acts as a reaction brake for sun gear S2 during operation in second and sixth forward driving ratios. During operation of the third forward driving ratio, direct friction element CL/B is applied together with forward friction element CL/A. The elements of gearset 41 then are locked together to effect a direct driving connection between shaft 58 and output shaft 48. If friction element CL/B is applied during third ratio operation when clutch A is applied and friction element CL/C is released, a downshift from the third ratio to the second ratio would be affected as friction element CL/C is applied in synchronism with release of friction element CL/B. If friction element CL/B is applied during third ratio operation when friction element CL/A is applied and friction element CL/B is released, an upshift from the third ratio to the fourth ratio is effected as friction element CL/E is applied in synchronism with release of friction element CL/B. The torque output side of forward friction element CL/A is connected through torque transfer element 54 to the torque input side of direct friction element CL/B, during forward drive. The torque output side of direct clutch CL/B, during forward drive, is connected to shaft 60 through torque transfer element 59. Reverse drive is established by applying low-and-reverse friction element CL/D and friction element CL/B. More details of this type of transmission arrangement are found in U.S. Pat. No. 7,216,025, which is hereby incorporated by reference.

The friction elements CL (A-E) are powered by the automatic transmission fluid pumped by pump assembly 39 in accordance with instructions provided by controller 25 through communication lines 28. Each friction element CL (A-E) has a corresponding communication channel A-E so that friction elements CL (A-E) may be controlled independently. Also, information from sensors on transmission 18, such as an automatic fluid temperature sensor 62, send information to controller 25 through communication lines 28. More specifically, transmission control algorithms 70 are employed to control the shifting of gear ratios in transmission 18, while engine control algorithms 72 operate in controller 25 in order to control engine 12. Engine control algorithms 72 receive information from driver directed signals 75, such as a desired speed and information from engine 12, preferably engine speed in RPM from a speed sensor 77 and engine coolant temperature sensor, and communicate with transmission control algorithms 70.

Figure 3:
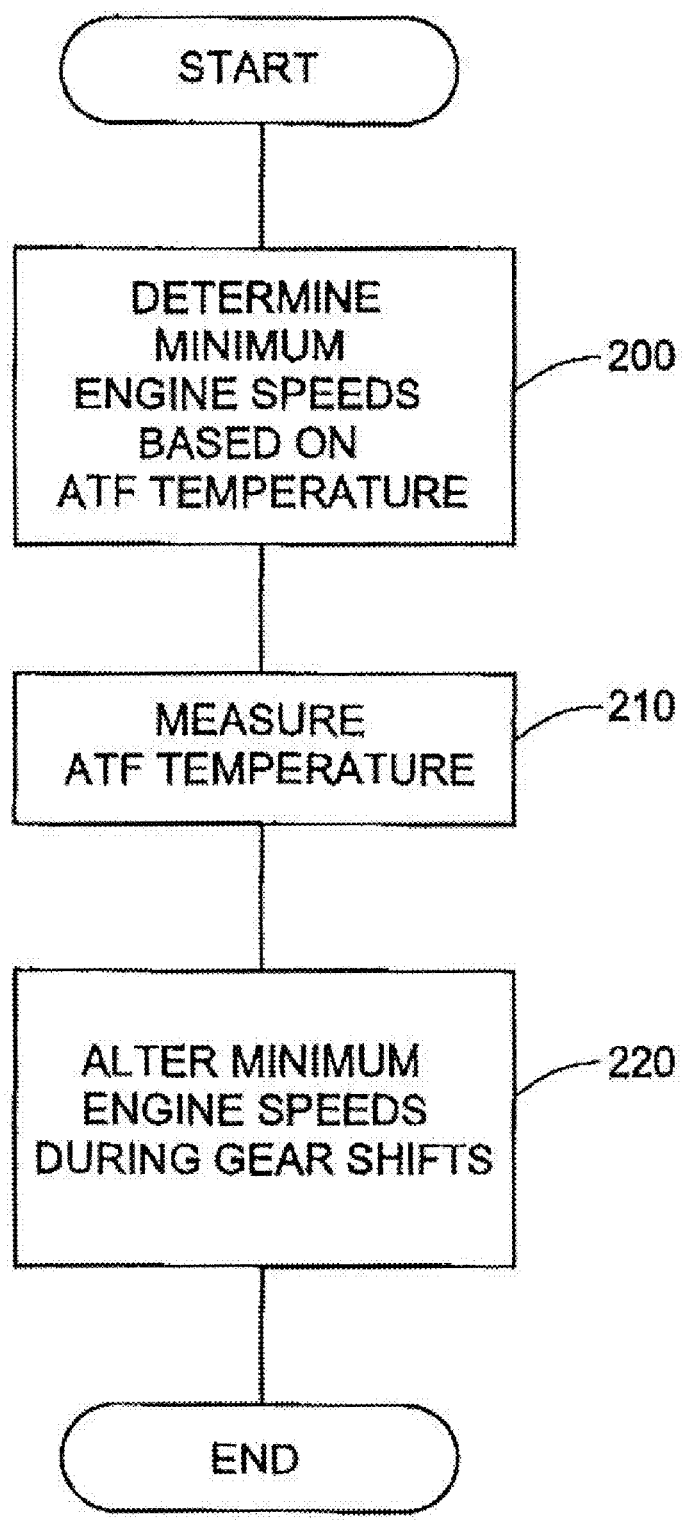
FIG. 3 is a basic flowchart showing a control routine employed in the system of FIG. 1 according to a preferred embodiment of the invention.

The operation of controller 25 can be further understood with reference to the basic flow chart shown in FIG. 3. Initially, controller 25 determines minimum engine speeds at step 200 based on the temperature of the automatic transmission fluid. Preferably, the minimum engine speed is set to no greater than 900 rpm for temperatures below 210° F. and no less than 1000 rpm for temperatures above 210° F. However, it is desirable to prevent controller 25 from constraining the minimum engine speed unless absolutely necessary. Therefore, the minimum engine speed is preferably made a function of transmission oil temperature and engine coolant temperature, which may allow for a lower minimum engine speed as compared to a minimum engine speed determined based solely on automatic transmission fluid temperature. At step 210, the temperature of the automatic transmission fluid is measured. Then, at step 220, the temperature is compared to a predetermined temperature used to determine minimum engine speeds. With this information, the engine speed is altered by controller 25 during gear shifts to be at or above the minimum engine speed determined in step 200. As a result of this method, the use of smaller oil pump assemblies with low drag is enabled. Additionally, the lower minimum engine speed results in improved fuel economy. Generally, a higher minimum engine speed required to protect transmission 18 will be invoked only when elevated transmission oil temperatures and their associated lower viscosity threaten to affect the operation of friction elements CL(A-E) or provide too little lubrication as further explained below.

Figure 3A:
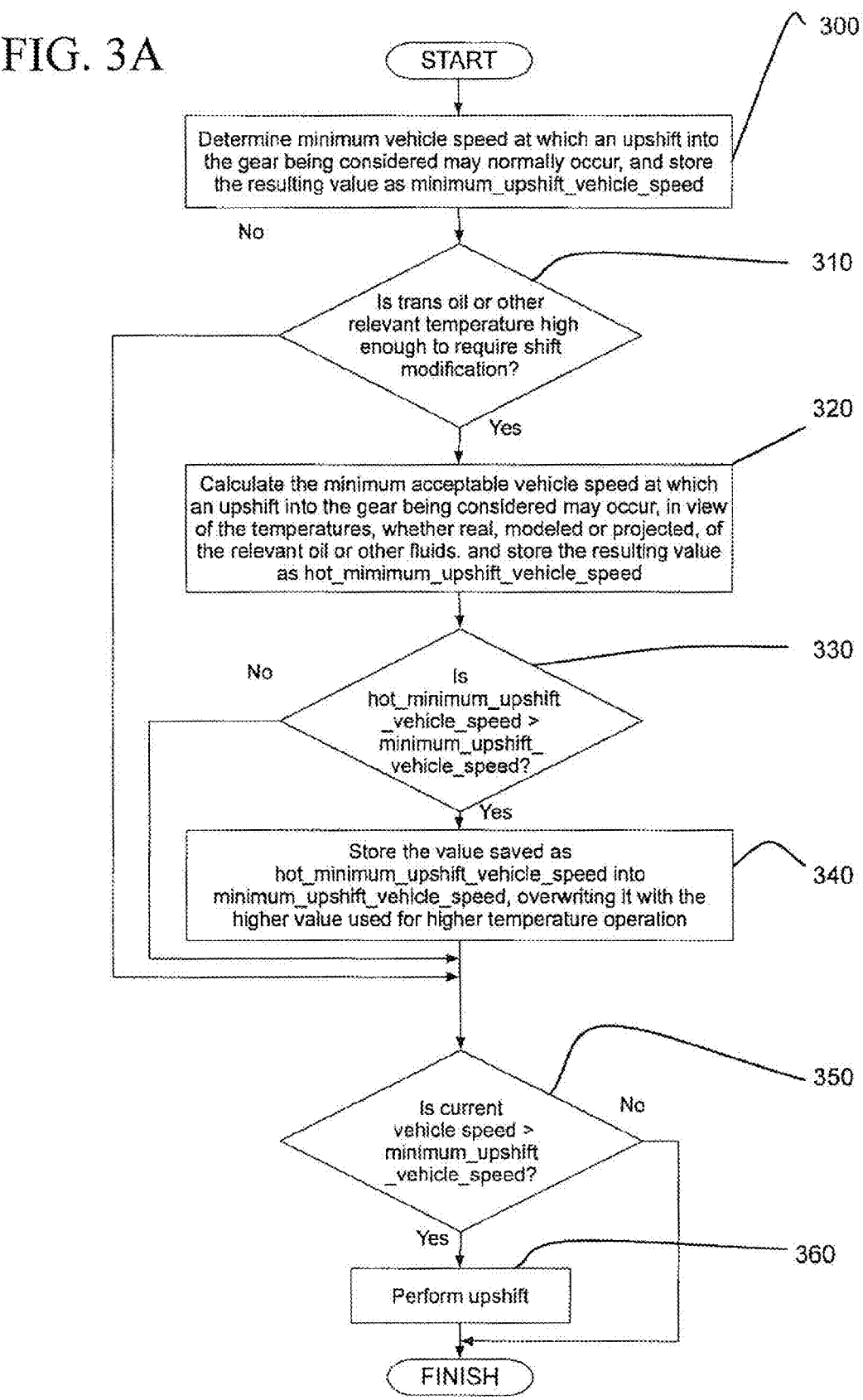
FIG. 3A is a detailed flowchart showing another preferred embodiment of a control routine employed in the system of FIG. 1.

FIG. 3A shows a more detailed flowchart showing the operation of controller 25 according to a second preferred embodiment of the invention. Initially, at step 300, controller 25 determines the minimum vehicle speed at which an upshift into a higher gear or gear ratio may normally occur. The minimum vehicle speed is assigned a variable name such as "minimum_upshift_vehicle_speed". The value determined to be the minimum vehicle speed is then stored as the variable "minimum_upshift_vehicle_speed". Then controller 25 determines, at step 310, whether or not the temperature of the automatic transmission fluid is high enough to require some type of shift modification. If the temperature is high enough, controller 25 proceeds to step 320 and calculates the minimum acceptable acceptable speed at which an upshift may occur in view of the measured temperature. As noted above, the variable "hot_minimum_upshift_vehicle_speed" could also be based on measuring the temperature of the automatic transmission fluid in combination with engine coolant temperature. Furthermore, the temperature used does not have to be directly measured but could also be estimated, modeled or projected. The resulting value is stored as the variable "hot_minimum_upshift_vehicle_speed". At step 330, controller 25 determines if "hot_minimum_upshift_vehicle_speed" is greater than "minimum_upshift_vehicle_speed" and, if so, the value for "minimum_upshift_vehicle_speed" is overwritten with the value for "hot_minimum_upshift_vehicle_speed", which is the value that controller 25 uses for high temperature operation. The process then continues to step 350 where controller 25 determines if the current vehicle speed is greater than the "minimum_upshift_vehicle_speed" and, if so, an upshift is performed at step 360. If not, the system does not perform an upshift and the process ends. If the transmission temperature is not high enough to require shift modification in step 310, the process goes directly to step 350. Likewise, if the "hot_minimum_upshift_vehicle_speed" is not greater than the "minimum_upshift_vehicle_speed" in step 330, the process also goes directly to step 350. Preferably, this process is conducted on a continuous basis, thus constantly monitoring the shifting process to adjust for temperature changes of the automatic transmission fluid. The process for a downshift is essentially a mirror image of the upshift strategy and therefore will not be discussed separately.

Figure 4:
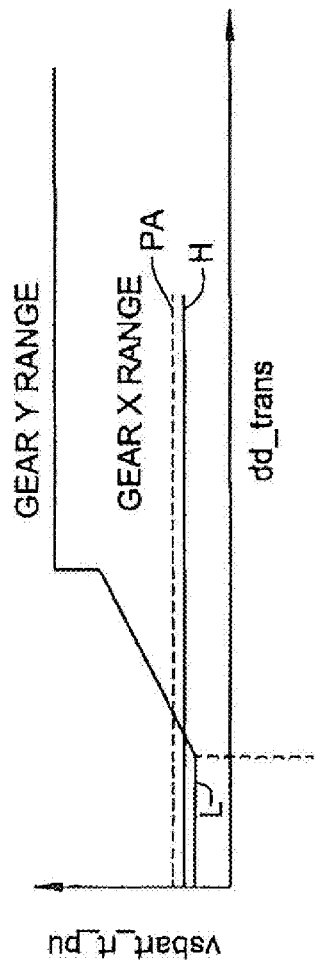
FIG. 4 is a graph showing a transmission upshift in accordance with the invention.

FIG. 4 is a graph representing an upshift from a lower gear ratio X to a higher gear ratio Y conducted while using the method shown in FIG. 3. The vertical axis represents an average filtered vehicle speed before the shift, while the horizontal axis represents driver demand as derived from the position of an accelerator pedal or some other driver directed signal. A shift curve is shown that represents the transition where controller 25 will shift gears. For example, at a given driver demand, controller 25 will shift gears when the averaged filtered vehicle speed increased to above the shift curve. At a higher driver demand, the vehicle speed will be relatively higher before a shift occurs. The shift curve in accordance with the invention is significantly lower at low driver demand values than prior art shift curves, thereby enabling a lower minimum engine speed at normal automatic fluid temperatures. The prior art minimum is shown by a dashed line PA, the high temperature line H is shown just below the dashed line and the normal temperature line L is the lowest line in the graph. At high temperatures, the curve is clipped to maintain an engine speed that allows pump 42 to provide sufficient pressure to the friction elements CL (A-E) and lubrication to the transmission 18.

Figure 5:
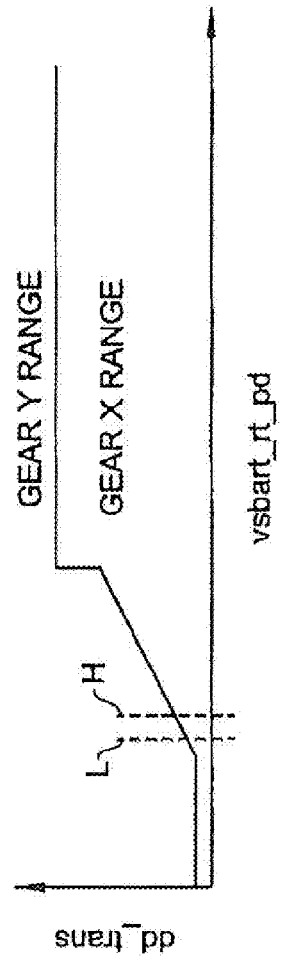
FIG. 5 is a graph showing a transmission downshift in accordance with the invention.

FIG. 5 is a graph representing a downshift from a higher gear ratio X to a lower gear ratio Y conducted while using the method shown in FIG. 3. The vertical axis represents driver demand as derived from the position of an accelerator pedal or some other driver detected signal, while the horizontal axis represents a predicted engine transmission speed after the gear shift. A shift curve is shown that represents the transition where controller 25 will shift gears. For example, at a given predicted engine speed after shift, controller 25 will shift gears when the driver demand increases to above the shift curve. At a higher predicted engine speed after the shift, the driver demand will be relatively higher before a shift occurs. The shift curve in accordance with the invention will always request downshifts at a minimum engine speed as represented by the dashed lines. At normal temperatures, the minimum speed is represented by dashed line L. That minimum engine speed will be higher shown by dashed lined H at higher transmission fluid temperatures to allow the pump to provide sufficient pressure to the friction elements and lubrication to the transmission.

Based on the above, it should be apparent that the present invention provides for a system that regulates a minimum engine speed based on automatic transmission fluid temperature to enable a smaller sized pump to be utilized and increases fuel economy. Although described with reference to a preferred embodiment of the invention, it should be readily understood that various changes and/or modifications can be made to the invention without departing from the spirit thereof. For instance, the way the minimum engine speed is enforced may be a change in shift points depending on measured temperature of the automatic transmission fluid or the controller may simply switch gear ratios when a certain engine speed is reached, regardless of what other inputs to the controller may suggest. In general, the invention is only intended to be limited by the scope of the following claims.

The invention claimed is:

1. In a vehicle having an engine for providing power, an automatic transmission connected to the engine including multiple gear ratios and friction elements with associated actuators for engaging and disengaging the friction elements to shift the automatic transmission between gear ratios, a pump driven by the engine for establishing a flow of automatic transmission fluid, a method for improving vehicle efficiency comprising:

determining a temperature of the automatic transmission fluid; and setting a minimum speed of the engine while shifting between the gear ratios of the automatic transmission based on the temperature of the automatic transmission fluid, wherein a reduction in pump size is enabled while still being able to supply the automatic transmission fluid to the friction elements to provide lubrication and to the actuators to enable the actuators to engage and disengage the friction elements in a timely and effective manner.

2. The method according to claim 1, wherein setting a minimum engine speed further comprises setting the minimum engine speed to no greater than 900 rpm when the temperature of the automatic transmission fluid is below 210° F.

3. The method according to claim 1, wherein setting a minimum engine speed further comprises setting the minimum engine speed to no less than 1000 rpm when the temperature of the automatic transmission fluid is above 210° F.

4. The method according to claim 1, further comprising:
sensing an engine coolant temperature: and
altering the minimum engine speed based on the engine coolant temperature.

5. The method according to claim 1, wherein determining a temperature of the automatic transmission fluid includes directly measuring the automatic transmission fluid.

6. The method according to claim 1, wherein determining a temperature of the automatic transmission fluid includes using a model to determine the temperature.

7. In a vehicle having an engine for providing power, an automatic transmission connected to the engine including multiple gear ratios and friction elements with associated actuators for engaging and disengaging the friction elements to shift the automatic transmission between gear ratios, a pump driven by the engine for establishing a flow of automatic transmission fluid, a method for improving vehicle efficiency comprising:
determining a temperature of the automatic transmission fluid;
determining a value of a first minimum vehicle speed at which an upshift into a higher gear ratio may normally occur;
determining if the temperature of the automatic transmission fluid is high enough to require shift modification;
if shift modification is required then setting a value of a second minimum vehicle speed for shifting between the gear ratios of the automatic transmission based on the temperature of the automatic transmission fluid;
determining if the value of second minimum vehicle speed is greater than the value of first minimum vehicle speed; and
if the value of second minimum vehicle speed is greater than the value of first minimum vehicle speed, then setting the value of the first minimum vehicle speed to the value of the second minimum vehicle speed;
performing an upshift if a current vehicle speed is above the value of first minimum vehicle speed.

8. The method according to claim 7, wherein setting the minimum vehicle speed further comprises setting a minimum engine speed, which corresponds to the minimum vehicle speed, to no greater than 900 rpm when the temperature of the automatic transmission fluid is below 210° F.

9. The method according to claim 7, wherein setting a minimum engine speed further comprises setting a minimum engine speed, which corresponds to the minimum vehicle speed, to no less than 1000 rpm when the temperature of the automatic transmission fluid is above 210° F.

10. The method according to claim 7, further comprising:
sensing an engine coolant temperature: and
altering a minimum engine speed and the second minimum vehicle speed based on the engine coolant temperature.

11. In a vehicle having an engine for providing power, an automatic transmission connected to the engine including multiple gear ratios and friction elements with associated actuators for engaging and disengaging the friction elements to shift the automatic transmission between gear ratios, a pump driven by the engine for establishing a flow of automatic transmission fluid, a method for improving vehicle efficiency comprising:
determining a temperature of the automatic transmission fluid;
setting a minimum speed of the engine while shifting between the gear ratios of the automatic transmission based on the temperature of the automatic transmission fluid, to either no greater than 900 rpm when the temperature of the automatic transmission fluid is below 210° F. or no less than 1000 rpm when the temperature of the automatic transmission fluid is above 210° F., wherein a reduction in pump size is enabled while still being able to supply the automatic transmission fluid to the friction elements to provide lubrication and to the actuators to enable the actuators to engage and disengage the friction elements in a timely and effective manner.

12. The method according to claim 11, further comprising:
sensing an engine coolant temperature: and
altering the minimum engine speed based on the engine coolant temperature.

13. The method according to claim 11, wherein determining a temperature of the automatic transmission fluid includes directly measuring the automatic transmission fluid.

14. The method according to claim 11, wherein determining a temperature of the automatic transmission fluid includes using a model to determine the temperature.

* * * * *